United States Patent Office 3,759,910
Patented Sept. 18, 1973

3,759,910
TRIAZOLO TRIAZINONES
Karlfried Dickore and Ludwig Eue, both % Farbenfabriken Bayer AG., Leverkusen, Germany
No Drawing. Filed Dec. 9, 1970, Ser. No. 96,647
Claims priority, application Germany, Dec. 31, 1969,
P 19 65 739.7
Int. Cl. C07d 57/34
U.S. Cl. 260—249.5                   21 Claims

ABSTRACT OF THE DISCLOSURE

New 1,2,3,7 - tetrahydro-[1,2,4]triazolo[3,2-c][1,2,4]-triazinone-(7) compounds of the formula

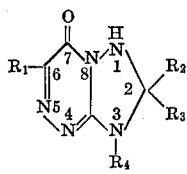

in which:
$R_1$ is hydrogen, substituted or unsubstituted alkyl, alkenyl, cycloalkyl, aralkyl or aryl;
$R_2$ and $R_3$ individually are hydrogen, substituted or unsubstituted alkyl, alkenyl, cycloalkyl, cycloalkenyl or aralkyl; and
$R_2$ and $R_3$ taken together, are alkylene of from 4 to 7 ring carbon atoms which may carry one or more alkyl group substituents, and
$R_4$ is hydrogen, alkyl, alkenyl, aralkyl or substituted or unsubstituted aryl.

are prepared by a novel synthesis by reacting the corresponding diamino dihydro triazinone compound with an oxo compound of the formula

in the presence of a lower alkanoic acid.

The novel compounds are outstandingly effective as herbicides, e.g., as selective herbicides.

---

The present invention relates to certain new 1,2,3,7-tetrahydro - [1,2,4]triazolo[1,2,4]triazinone - (7) compounds, and to a novel process for their production. In different aspect, the invention relates to herbicidal compositions containing these compounds and to herbicidal methods.

It is known that 3,7-dihydro-[1,2,4]triazolo[3,2-c][1,2,4]triazinones-(7), for example 3-benzyl-6-phenyl-3,7-dihydro-[1,2,4]triazolo[3,2-c][1,2,4]triazinone - (7) which has the formula

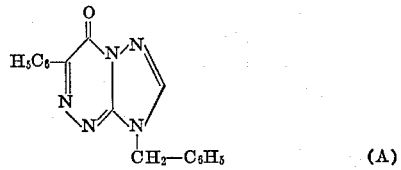

(A)

are obtained when 3,4-diaminodihydrotriazinones-(5) are reacted with carboxylic acids or their anhydrides (Chem. Ber. 97, pp. 2173–2178 (1964)). These dihydrotriazolotriazinones possess a slight degree of herbicidal activity. Heretofore, no process for the preparation of 1,2,3,7-tetrahydro-[1,2,4]triazolo[3,2-c] [1,2,4]triazinones - (7) has been described in the literature.

It is, furthermore, known that 4-amino-3-thioxo-6-methyl-2,3,4,5-tetrahydro-1,2,4-triazinone-(5) reacts with p-nitrobenzaldehyde to give the p-nitrobenzylidene compound (Schiff base) of the formula

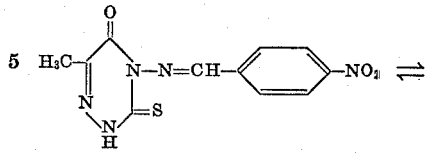

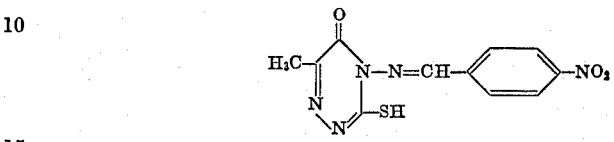

(B)

and not the corresponding thiadiazolotriazinone of the formula

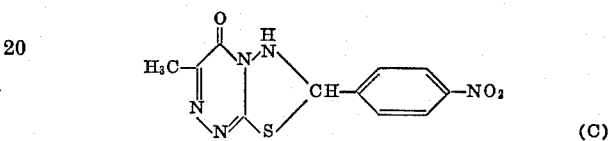

(C)

(see Periodica Polytechnica Hung. 12, pages 259–275 (1968)).

The present invention provides 1,2,3,7-tetrahydro[1,2,4]triazolo[3,2-c][1,2,4]triazinones-(7) of the formula

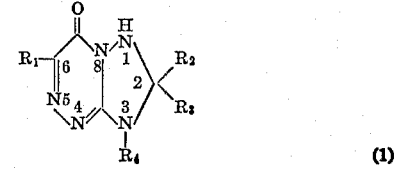

(1)

in which:
$R_1$ is a hydrogen or optionally substituted alkyl (which may be straight-chain or branched), alkenyl, cycloalkyl, aralkyl or aryl radical,
each of R and $R_3$ independently is hydrogen or optionally substituted alkyl (which may be straight-chain or branched), alkenyl, cycloalkyl, cycloalkenyl or aralkyl radical, or
$R_2$ and $R_3$ together are alkylene with 4 to 7 carbon atoms which may carry one or more alkyl group substituents, and
$R_4$ is hydrogen, alkyl, alkenyl, aralkyl or an optionally substituted aryl radical.

Preferably, $R_1$ is lower branched alkyl, and $R_2$ and $R_3$ are also preferably lower alkyl or, when taken together, a lower alkylene bridge of, e.g. 4 to 6 carbon atoms, in the novel compounds of this invention. $R_4$ is also preferably lower alkyl.

The present invention also provides a process for the production of a compound of the Formula 1 defined above, in which a 3,4-diamino-4,5-dihydro-1,2,4-triazinone-(5) of the formula

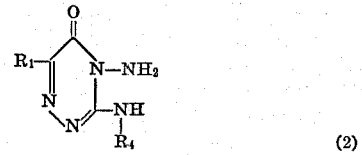

(2)

in which $R_1$ and $R_4$ have the meanings given above, is reacted with an oxo compound of the formula

(3)

in which $R_2$ and $R_3$ have the meanings given above, in the presence of a lower aliphatic carboxylic acid.

It is decidedly surprising that the reaction described above takes the course stated and leads smoothly to a 1,2,3,7 - tetrahydro[1,2,4]triazolo[3,2-c]triazinone-(7) in a high yield. Rather, it would have been expected either that the carbonyl compound of the Formula 3 would react with the 3,4-diamino-4, 5-dihydro-1,2,4-triazinone-(5) of the Formula 2 to form a Schiff base of the type (B) (see Periodica Polytechnica Hung. 12, pages 259–275 (1968)) or that the triazinone of the Formula 2 would react with the lower aliphatic carboxylic acid, present as an auxiliary material, with the formation of a 3,7-dihydro-[1,2,4]triazolo[3,2-c][1,2,4]triazinone-(7) of the type (A) (see Chem. Ber. 97, pages 2173–2178 (1964)).

The isomeric Schiff bases can, in general, be obtained by carrying out the condensation of the Compounds 2 and 3 in the presence of strong acids such as mineral acids or organic sulphonic acids.

The process of the invention permits the syntheses, in a simple manner, of numerous new 1,2,3,7-tetrahydro [1,2,4]triazolo[3,2-c][1,2,4]triazinones, and is therefore a broadly applicable enrichment of the art.

If 4-amino-3-methylamino-6-tert-butyl-4,5 - dihydro - 1, 2,4-triazinone-(5) and acetone are used as starting materials, the reaction course can be represented by the following formula scheme

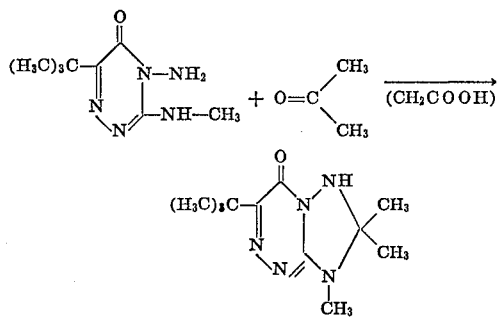

The 3,4-diamino-4,5-dihydro-1,2,4-triazinones-(5) to be used as starting materials are defined generally by the Formula 2. In Formula 2, as in Formula 1, $R_1$ stands preferably for a branched alkyl radical with 3, 4 or 5 carbon atoms, a cyclohexyl radical or a phenyl group, which may be substituted by chlorine, and $R_4$ stands preferably for methyl or ethyl.

As examples of the 3,4-diamino-4,5-dihydro-1,2,4-triazinones-(5) which can be used according to the invention, there are mentioned:

4-amino-3-butylamino-6-methyl-4,5-dihydro-1,2,4-triazinone-(5),
4-amino-3-anilino-6-methyl-4,5-dihydro-1,2,4-triazinone-(5),
4-amino-3-benzylamino-6-methyl-4,5-dihydro-1,2,4-triazinone-(5),
4-amino-3-butylamino-6-phenyl-4,5-dihydro-1,2,4-triazinone-(5),
4-amino-3-benzylamino-6-phenyl-4,5-dihydro-1,2,4-triazinone-(5),
4-amino-3-anilino-6-phenyl-4,5-dihydro-1,2,4-triazinone-(5),
3,4-diamino-6-methyl-4,5-dihydro-1,2,4-triazinone-(5),
3,4-diamino-6-ethyl-4,5-dihydro-1,2,4-triazinone-(5),
3,4-diamino-6-propyl-4,5-dihydro-1,2,4-triazinone-(5),
3,4-diamino-6-isopropyl-4,5-dihydro-1,2,4-triazinone-(5),
3,4-diamino-6-n-butyl-4,5-dihydro-1,2,4-triazinone-(5),
3,4-diamino-6-isobutyl-4,5-dihydro-1,2,4-triazinone-(5),
3,4-diamino-6-tert.-butyl-4,5-dihydro-1,2,4-triazinone-(5),
3,4-diamino-6-cyclopentyl-4,5-dihydro-1,2,4-triazinone-(5),
3,4-diamino-6-cyclohexyl-4,5-dihydro-12,4-triazinone-(5),
3,4-diamino-6-(4-methylcyclohexyl)-4,5-dihydro-1,2,4-triazinone-(5),
3,4-diamino-6-phenyl-4,5-dihydro-1,2,4-triazinone-(5),
3,4-diamino-6-(3-chlorophenyl)-4,5-dihydro-1,2,4-triazinone-(5),
3,4-diamino-6-(4-chlorophenyl)-4,5-dihydro-1,2,4-triazinone-(5),
3,4-diamino-6-benzyl-4,5-dihydro-1,2,4-triazinone-(5),
3,4-diamino-6-(2-chlorobenzyl)-4,5-dihydro-1,2,4-triazinone-(5),
3,4-diamino-6-(3-chlorobenzyl)-4,5-dihydro-1,2,4-triazinone-(5),
3,4-diamino-6-(4-chlorobenzyl)-4,5-dihydro-1,2,4-triazinone-(5),
3,4-diamino-6-(3,4-dichlorobenzyl)-4,5-dihydro-1,2,4-triazinone-(5),
4-amino-3-methylamino-6-methyl-4,5-dihydro-1,2,4-triazinone-(5),
4-amino-3-methylamino-6-ethyl-4,5-dihydro-1,2,4-triazinone-(5),
4-amino-3-methylamino-6-propyl-4,5-dihydro-1,2,4-triazinone-(5),
4-amino-3-methylamino-6-isopropyl-4,5-dihydro-1,2,4-triazinone-(5),
4-amino-3-methylamino-6-n-butyl-4,5-dihydro-1,2,4-triazinone-(5),
4-amino-3-methylamino-6-isobutyl-4,5-dihydro-1,2,4-triazinone-(5),
4-amino-3-methylamino-6-tert.-butyl-4,5-dihydro-1,2,4-triazone-(5),
4-amino-3-methylamino-6-cyclopentyl-4,5-dihydro-1,2,4-triazinone-(5),
4-amino-3-methylamino-6-cyclohexyl-4,5-dihydro-1,2,4-triazinone-(5),
4-amino-3-methylamino-6-(4-methylcyclohexyl)-4,5-dihydro-1,2,4-triazinone-(5),
4-amino-3-methylamino-6-cycloheptyl-4,5-dihydro-1,2,4-triazinone-(5),
4-amino-3-methylamino-6-phenyl-4,5-dihydro-1,2,4-triazinone-(5),
4-amino-3-methylamino-6-(4-methylphenyl)-4,5-dihydro-1,2,4-triazinone-(5),
4-amino-3-methylamino-6-(4-isopropylphenyl)-4,5-dihydro-1,2,4-triazinone-(5),
4-amino-3-methylamino-6-(4-tert.-butylphenyl)-4,5-dihydro-1,2,4-triazinone-(5),
4-amino-3-methylamino-6-(2-chlorophenyl)-4,5-dihydro-1,2,4-triazinone-(5),
4-amino-3-methylamino-6-(3-chlorophenyl)-4,5-dihydro-1,2,4-triazinone-(5),
4-amino-3-methylamino-6-(4-chlorophenyl)-4,5-dihydro-1,2,4-triazinone-(5),
4-amino-3-methylamino-6-(3,4-dichlorophenyl)-4,5-dihydro-1,2,4-triazinone-(5),
4-amino-3-methylamino-6-benzyl-4,5-dihydro-1,2,4-triazinone-(5),
4-amino-3-methylamino-6-cyclohexylmethyl-4,5-dihydro-1,2,4-triazinone-(5),
4-amino-3-methylamino-6-(2-chlorobenzyl)-4,5-dihydro-1,2,4-triazinone-(5),
4-amino-3-methylamino-6-(3-chlorobenzyl)-4,5-dihydro-1,2,4-triazinone-(5),
4-amino-3-methylamino-6-(4-chlorobenzyl)-4,5-dihydro-1,2,4-triazinone-(5),
4-amino-3-methylamino-6-(3,4-dichlorobenzyl)-4,5-dihydro-1,2,4-triazinone-(5),
4-amino-3-methylamino-6-propenyl-4,5-dihydro-1,2,4-triazinone-(5),
4-amino-3-methylamino-6-cinnamyl-4,5-dihydro-1,2,4-triazinone-(5),
4-amino-3-methylamino-6-($\alpha$-phenylethyl)-4,5-dihydro-1,2,4-triazinone-(5),
4-amino-3-methylamino-6-($\beta$-phenylethyl)-4,5-dihydro-1,2,4-triazinone-(5), 4-amino-3-methylamino-6-(2-methylbutyl)-4,5-dihydro-1,2,4,-triazinone-(5),
4-amino-3-methylamino-6-(2-methylpropyl)-4,5-dihydro-1,2,4-triazinone-(5),
4-amino-3-methylamino-6-isopropenyl-4,5-dihydro-1,2,4-triazinone-(5),
4-amino-3-methylamino-6-cyclohexen-(1)-yl-4,5-dihydro-1,2,4-triazinone-(5),
4-amino-3-ethylamino-6-isopropyl-4,5-dihydro-1,2,4-triazinone-(5),
4-amino-3-ethylamino-6-methyl-4,5-dihydro-1,2,4-triazinone-(5),
4-amino-3-ethylamino-6-propyl-4,5-dihydro-1,2,4-triazinone-(5),
4-amino-3-ethylamino-6-n-butyl-4,5-dihydro-1,2,4-triazinone-(5),
4-amino-3-ethylamino-6-isobutyl-4,5-dihydro-1,2,4-triazinone-(5),
4-amino-3-ethylamino-6-tert.-butyl-4,5-dihydro-1,2,4-triazinone-(5),
4-amino-3-ethylamino-6-cyclohexyl-4,5-dihydro-1,2,4-triazinone-(5),
4-amino-3-ethylamino-6-cyclohexylmethyl-4,5-dihydro-1,2,4-triazinone-(5),
4-amino-3-ethylamino-6-(4-methylcyclohexyl)-4,5-dihydro-1,2,4-triazinone-(5),
4-amino-3-ethylamino-6-benzyl-4,5-dihydro-1,2,4-triazinone-(5),
4-amino-3-ethylamino-6-phenyl-4,5-dihydro-1,2,4-triazinone-(5),
4-amino-3-ethylamino-6-(3,4-dichlorophenyl)-4,5-dihydro-1,2,4-triazinone-(5),
4-amino-3-n-butylamino-6-isopropyl-4,5-dihydro-1,2,4-triazinone-(5),
4-amino-3-dodecylamino-6-isopropyl-4,5-dihydro-1,2,4-triazinone-(5),
4-amino-3-anilino-6-isopropyl-4,5-dihydro-1,2,4-triazinone-(5),
4-amino-3-n-butylamino-6-cyclohexyl-4,5-dihydro-1,2,4-triazinone-(5),
4-amino-3-n-butylamino-6-tert.-butyl-4,5-dihydro-1,2,4-triazinone-(5),
4-amino-3-benzylamino-6-isopropyl-4,5-dihydro-1,2,4-triazinone-(5),
4-amino-3-benzylamino-6-tert.-butyl-4,5-dihydro-1,2,4-triazinone-(5),
4-amino-3-benzylamino-6-cyclohexyl-4,5-dihydro-1,2,4-triazinone-(5),
4-amino-3-benzylamino-6-phenyl-4,5-dihydro-1,2,4-triazinone-(5),
4-amino-3-allylamino-6-isopropyl-4,5-dihydro-1,2,4-triazinone-(5),
4-amino-3-allylamino-6-tert.-butyl-4,5-dihydro-1,2,4-triazinone-(5),
4-amino-3-allylamino-6-cyclohexyl-4,5-dihydro-1,2,4-triazinone-(5),
4-amino-3-allylamino-6-phenyl-4,5-dihydro-1,2,4-triazinone-(5),
4-amino-3-methylamino-4,5-dihydro-1,2,4-triazinone-(5),
4-amino-3-ethylamino-4,5-dihydro-1,2,4-triazinone-(5),
4-amino-3-benzylamino-4,5-dihydro-1,2,4-triazinone-(5).

Some of the 3,4-diamino-4,5-dihydro-1,2,4-triazinones-(5) of the Formula 2 used as starting materials are known (see Chem. Ber 97, pages 2173–2178 and Belgian Patent Sepecification 697,083). The not-yet-known triazinones can be prepared according to known methods by cyclisation of α-oxocarboxylic acids with diaminoguanidines or by aminolysis of 4-amino-3-alkylmercapto-4,5-dihydro - 1,2,4 - triazinones - (5) (see the preparative examples herein).

The oxo compounds of the Formula 3 used as starting materials are all known. As examples of aldehydes and ketones which can be used, there are mentioned: formaldehyde, acetaldehyde, propionaldehyde, n-butyraldehyde, isobutyraldehyde, valeraldehyde, isovaleraldehyde, tetrahydrobenzaldehyde, hexahydrobenzaldehyde, cinnamaldehyde, hydrocinnamaldehyde, chloral hydrate, pivalaldehyde, acetone, methyl-ethyl ketone, cyclohexanone, cyclopentanone, cycloheptanone, methylisopropyl ketone, trichloroacetone, trifluoroacetone or hexafluoroacetone.

As diluents for the reaction of the preparative process, all inert organic solvents are suitable. The preferred solvents include hydrocarbons, such as benzine, benzene and toluene; ethers, such as dioxane and tetrahydrofuran; and chlorinated hydrocarbons, such as chlorobenzene or the dichlorobenzenes.

It is, however, expedient to carry out the reaction without the use of a solvent and, instead, to use an excess of the lower aliphatic carboxylic acid necessary as an auxiliary material. Carboxylic acids with from 1 to 5 carbon atoms, such as formic acid, acetic acid, propionic acid, butyric acid or isobutyric acid, can be used for this purpose; acetic acid is the preferred carboxylic acid.

The reaction temperature can be varied within a fairly wide range. In general, the work is carried out at from 20° to 120° C., preferably from 50° to 100° C.

The use of pressure is, in general, not necessary. Oxo compounds gaseous at room temperature however, can be reacted in an autoclave.

When carrying out the process according to the invention, 1 to 20 moles of the oxo compound of the Formula 3 and 0.1 to 20 moles of the lower aliphatic carboxylic acid are generally used to 1 mole of the 3,4-diamino-4,5-dihydro-1,2,4-triazinone-(5) of the Formula 2 and the mixture is heated until the end of the reaction. Preferably, the oxo compound and the carboxylic acid are used in excess.

The isolation of the reaction products can be effected by evaporation of the reaction mixture or, where water-miscible oxo compounds and carboxylic acids are used, by pouring into water and subsequently effecting suction filtration of the precipitated reaction product. If necessary, the reaction products can be purified in any customary manner, for example by recrystallisation from organic solvents.

The new 1,2,3,7 - tetrahydro - [1,2,4]triazolo[3,2-c][1,2,4]triazinones-(5) according to the invention have herbicidal properties and can therefore be used for the control of weeds.

By weeds in the widest sense are meant all plants which grow in places where they are not wanted. Whether the active compounds according to the invention act as total or selective herbicidal agents depends on the amount of active compound applied.

The substances according to the invention can be used for example in the case of the following plants: dicotyledons, such as mustard (Sinapis), cress (Lepidium), cleaver (Galium), common chickweed (Stellaria), mayweed (Matricaria), smallflower Galinsoga (Galinsoga), fathen (Chenopodium), stinging nettles (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza) oats (Avena), barley (Hordeum), wheat (Triticum), millet (Panicum), sugar cane (Saccharum).

The new compounds show an excellent selectivity in respect of cereals. They can therefore be used for selective weed control in cereals, for example maize, sorghum, oats, wheat, barley and rice; application should take place chiefly between sowing and emergence of the cultivated plants. In addition, some compounds are also suitable for selective weed control after the emergence of the cultivated plants, that is to say according to the postemergence process. In the case of application before emergence of the cultivated plants, the weeds can also be combated selectively in other cultivations, for example in cotton, potatoes, peas, soya, beans and flax.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohols ethers, for example alkylarylpolyglycol ethers, alkyl sulphonates and aryl sulphonates; and preferred examples of dispersing agents include lignin, sulphite waste liquors and methyl cellulose.

The active compounds according to the invention may be present in the formulations in admixture with other active compounds. The formulations contain, in general, from 0.1 to 95, preferably from 0.5 to 90, percent by weight of active compound.

The active compounds may be used as such or in the form of their formulations or of the applications forms prepared therefrom, such as ready-to-use solutions, emulsions, suspensions, powders, pastes and granulates. Application may be effected in the usual manner, for example by dusting, spraying, squirting, watering and scattering.

The amount of active compound applied may vary within fairly wide ranges. It depends essentially on the nature of the desired effect. In general, the amounts applied are from 0.1 to 20 kg., preferably from 1 to 10 kg. of active compound per hectare.

The present invention also provides a herbicidal composition containing as active ingredient a compound of the present invention in admixture with a solid diluent or carrier or in admixture with a liquid diluent or carrier containing a surface-active agent.

The present invention also provides a method of combating weeds which comprises applying to the weeds or a weed habitat a compound of the present invention alone or in the form of a composition containing as active ingredient a compound of the present invention in admixture with a solid or liquid diluent or carrier.

The present invention further provides crops protected from damage by weeds by being grown in areas in which immediately prior to and/or during the time of the growing a compound of the present invention was applied alone or in admixture with a solid or liquid diluent or carrier. It will be seen that the usual methods of providing a harvested crop may be enhanced by the present invention.

The activity of the compounds of the present invention is illustrated in and by the following examples, in which the following test compounds, illustrative of the novel compounds, were used.

TABLE 1

| Compound No. | Chemical name | Structure |
| --- | --- | --- |
| 1 | 2,2,3-trimethyl-6-tert.-butyl-1,2,3,7-tetrahydro-[1,2,4]-triazolo[3,2-c][1,2,4]-triazinone-(7) | |
| 2 | 2-ethyl-2,3-dimethyl-6-tert.-butyl-1,2,3,7-tetrahydro-[1,2,4]-triazolo[3,2-c][1,2,4]-triazinone-(7). | |
| 3 | 2-isopropyl-3-methyl-6-tert.-butyl-1,2,3,7-tetrahydro-[1,2,4]-triazolo-[3,2-c][1,2,4]-triazinone-(7). | |
| 4 | 2,2-pentamethylene-3-methyl-6-tert.-butyl-1,2,3,7-tetrahydro-[1,2,4]-triazolo-[3,2-c][1,2,4]-triazinone-(7). | |

TABLE 1—Continued

| Compound No. | Chemical name | Structure |
|---|---|---|
| 5 | 2,3-dimethyl-2-isopropyl-6-tert.-butyl-1,2,3,7,-tetrahydro-[1,2,4]-triazolo-[3-2-c][1,2,4]-triazinone-(7). | |
| 6 | 2,2,3-trimethyl-6-phenyl-1,2,3,7-tetrahydro-[1,2,4]-triazolo-[3,2-c]-[1,2,4]-triazinone-(7) | |
| 7 | 2,2,3-trimethyl-6-isopropyl-1,2,3,7-tetrahydro-[1,2,4]-triazolo-[3,2-c]-[1,2,4]-triazinone-(7) | |
| 8 | 2,2-pentamethylene-3-methyl-6-isopropyl-1,2,3,7-tetrahydro-[1,2,4]-triazolo-[3,2-c]-[1,2,4]-triazinone-(7). | |

EXAMPLE A

Pre-emergence test

Solvent: 5 parts by weight acetone
Emulsifier: 1 part by weight alkylaryl polyglycol ether To produce a siutable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After three weeks, the degree of damage to the test plants was determined and characterized by the values 0–5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged The active compounds, the amounts applied and the results obtained can be seen from the following table:

TABLE A
Pre-emergence test

| Active compound | Active compound applied, kg./hectare | Echinochloa | Chenopodium | Sinapis | Stellaria | Lolium | Galinsoga | Matricaria | Oats | Cotton | Wheat | Maize |
|---|---|---|---|---|---|---|---|---|---|---|---|---|
| (Compound A): (known) | 40 | 0 | 0 | 3 | 1 | 0 | 3 | 1 | 0 | 0 | 0 | 0 |
|  | 20 | 0 | 0 | 2 | 0 | 0 | 2 | 0 | 0 | 0 | 0 | 0 |
|  | 10 | 0 | 0 | 1 | 0 | 0 | 1 | 0 | 0 | 0 | 0 | 0 |
| Compound 1 | 10 | 5 | 5 | 5 | 5 | 5 | 5 | 5 | 4 | 5 | 3 | 5 |
|  | 5 | 5 | 5 | 5 | 5 | 5 | 5 | 5 | 3 | 5 | 1 | 5 |
|  | 2.5 | 5 | 5 | 5 | 5 | 4–5 | 5 | 5 | 1 | 4 | 0 | 4–5 |
|  | 1.25 | 5 | 5 | 4 | 5 | 4 | 5 | 5 | 0 | 4 | 0 | 4 |
| Compound 2 | 10 | 5 | 5 | 5 | 5 | 5 | 5 | 5 | 5 | 5 | 5 | 5 |
|  | 5 | 5 | 5 | 5 | 5 | 5 | 5 | 5 | 5 | 5 | 5 | 5 |
|  | 2.5 | 5 | 5 | 5 | 5 | 4–5 | 5 | 5 | 5 | 5 | 4 | 4 |
|  | 1.25 | 5 | 5 | 4 | 5 | 4 | 5 | 5 | 4 | 5 | 2 | 3 |

TABLE A—Continued

| Active compound | Active compound applied, kg./hectare | Echinochloa | Chenopodium | Sinapis | Stellaria | Lolium | Galinsoga | Matricaria | Oats | Cotton | Wheat | Maize |
|---|---|---|---|---|---|---|---|---|---|---|---|---|
| Compound 3 | 10 | 5 | 5 | 5 | 5 | 5 | 5 | 5 | 3 | 4 | 2 | 3 |
|  | 5 | 5 | 5 | 5 | 5 | 4 | 5 | 5 | 2 | 3 | 1 | 1 |
|  | 2.5 | 5 | 5 | 4-5 | 5 | 3 | 5 | 5 | 1 | 2 | 0 | 0 |
|  | 1.25 | 4-5 | 4 | 3 | 4-5 | 2 | 5 | 5 | 0 | 0 | 0 | 0 |
| Compound 4 | 10 | 5 | 5 | 5 | 5 | 5 | 5 | 5 | 5 | 5 | 5 | 5 |
|  | 5 | 5 | 5 | 5 | 5 | 5 | 5 | 5 | 4 | 4 | 4-5 | 4 |
|  | 2.5 | 5 | 5 | 5 | 4-5 | 3-4 | 5 | 5 | 4 | 4 | 4 | 3-4 |
|  | 1.25 | 5 | 5 | 5 | 4 | 2 | 5 | 5 | 3 | 4 | 2-3 | 3 |
| Compound 5 | 10 | 5 | 5 | 5 | 5 | 5 | 5 | 5 | 5 | 3 | 2-3 | 3 |
|  | 5 | 5 | 5 | 5 | 5 | 4-5 | 5 | 5 | 4 | 1-2 | 1 | 2 |
|  | 2.5 | 5 | 5 | 4 | 5 | 4 | 5 | 5 | 3 | 0 | 0 | 0 |
|  | 1.25 | 4-5 | 4-5 | 3 | 5 | 3 | 5 | 5 | 2 | 0 | 0 | 0 |
| Compound 6 | 10 | 5 | 5 | 5 | 5 | 5 | 5 | 5 | 5 | 3 | 3 | 4 |
|  | 5 | 5 | 5 | 5 | 5 | 5 | 5 | 5 | 4-5 | 2 | 2 | 3 |
|  | 2.5 | 5 | 5 | 4-5 | 5 | 5 | 5 | 5 | 4 | 1 | 0 | 1 |
|  | 1.25 | 5 | 5 | 4 | 5 | 4-5 | 5 | 5 | 3 | 0 | 0 | 0 |
| Compound 7 | 10 | 5 | 5 | 5 | 5 | 5 | 5 | 5 | 5 | 5 | 4 | 3 |
|  | 5 | 5 | 5 | 5 | 5 | 5 | 5 | 5 | 4-5 | 5 | 4 | 2 |
|  | 2.5 | 5 | 5 | 5 | 5 | 4-5 | 5 | 5 | 3 | 4 | 3 | 1 |
|  | 1.25 | 4-5 | 4-5 | 5 | 5 | 4 | 5 | 5 | 2 | 3 | 2 | 0 |
| Compound 8 | 10 | 5 | 5 | 5 | 5 | 5 | 5 | 5 | 3 | 4 | 3-4 | 3 |
|  | 5 | 5 | 5 | 5 | 5 | 5 | 5 | 5 | 2 | 4 | 3 | 2 |
|  | 2.5 | 4-5 | 4-5 | 5 | 5 | 4-5 | 5 | 5 | 1 | 4 | 2 | 0 |
|  | 1.25 | 4-5 | 4 | 5 | 5 | 4 | 5 | 5 | 0 | 2-3 | 0 | 0 |

EXAMPLE B

Post-emergence test

Solvent: 5 parts by weight acetone
Emulsifier: 1 part by weight alkylaryl polyglycol ether To produce a suitable preparation of active compound, 1 part by weight of active compound was mixed with the stated amount of solvent, the stated amount of emulsifier was added and the concentrate was then diluted with water to the desired concentration.

Test plants which have a height of about 5–15 cm. were sprayed with the preparation of the active compound so that the amounts of active compound per unit area which were stated in the table were applied. Depending on the concentration of the spray liquor, the amount of water applied lies betwen 1000 and 2000 liters/hectare. After three weeks, the degree of damage to the plants was determined and characterized by the values 0–5, which have the following meaning:

0 no effect
1 a few slightly burned spots
2 marked damage to leaves
3 some leaves and parts of stalks partially dead
4 plant partially destroyed
5 plant completely dead The active compounds, their concentration and the results obtained can be seen from the following table:

TABLE B
Post-emergence test

| Active compound | Active compound applied, kg./hectare | Echinochloa | Chenopodium | Sinapis | Galinsoga | Stellaria | Urtica | Matricaria | Daucus | Oats | Cotton | Wheat |
|---|---|---|---|---|---|---|---|---|---|---|---|---|
| (Compound A): 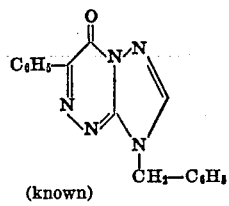 (known) | 8 | 3 | 0 | 4-5 | 3 | 3 | 3 | 2 | 2 | 1-2 | 1-2 | 0 |
|  | 4 | 2 | 0 | 4 | 2 | 2 | 1 | 1 | 1 | 0 | 1 | 0 |
|  | 2 | 1 | 0 | 3 | 2 | 2 | 1 | 1 | 1 | 0 | 0 | 0 |
| Compound 1 | 2 | 5 | 5 | 5 | 5 | 5 | 5 | 5 | 5 | 5 | 5 | 5 |
|  | 1 | 4-5 | 5 | 5 | 5 | 5 | 5 | 5 | 5 | 4-5 | 5 | 4 |
|  | 0.5 | 4-5 | 5 | 5 | 5 | 5 | 5 | 5 | 5 | 4 | 5 | 4 |
|  | 0.25 | 4 | 5 | 5 | 5 | 5 | 5 | 5 | 5 | 3 | 5 | 3 |
| Compound 2 | 2 | 5 | 5 | 5 | 5 | 5 | 5 | 5 | 5 | 5 | 5 | 5 |
|  | 1 | 5 | 5 | 5 | 5 | 5 | 5 | 5 | 5 | 4 | 5 | 4 |
|  | 0.5 | 5 | 5 | 5 | 5 | 5 | 5 | 5 | 5 | 3-4 | 5 | 3-4 |
|  | 0.25 | 4 | 5 | 5 | 5 | 5 | 5 | 4-5 | 4 | 3 | 5 | 3 |
| Compound 5 | 2 | 5 | 5 | 5 | 5 | 5 | 5 | 5 | 5 | 3 | 5 | 2 |
|  | 1 | 4-5 | 5 | 5 | 5 | 5 | 5 | 5 | 5 | 1-2 | 3 | 1 |
|  | 0.5 | 4-5 | 5 | 5 | 5 | 5 | 5 | 5 | 5 | 1 | 2-3 | 0 |
|  | 0.25 | 4 | 5 | 5 | 5 | 4-5 | 4 | 4 | 4-5 | 0 | 2 | 0 |

The following examples illustrate the process of the invention.

EXAMPLE 1

Preparation of 2,2,3 - trimethyl - 6 - tert.-butyl-1,2,3,7-tetrahydro-[1,2,4]triazole[3,2-c][1,2,4]triazinone-(7)

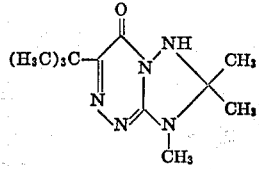

A mixture of 19.7 grams 4-amino-3-methylamino-6-tert.-butyl-4,5-dihydro-1,2,4-triazinone-(5), 50 ml. acetone and 50 ml. acetic acid was heated for one hour on a boiling water bath. Concentration was then effected and the crystalline residue remaining after thorough heating in a vacuum was recrystallized from 150 ml. benzene. There were obtained 21.6 grams (91% of the theory) of pure 2,2,3-trimethyl-6-tert.-butyl - 1,2,3,7 - tetrahydro-[1,2,4]triazolo[3.2-c][1,2,4]triazinone-(7) of M.P. 165–168° C. (decomp.).

The same compound was obtained when the acetic acid was replaced by formic aciid, propionic acid, butyric acid or isobutyric acid.

The 4-amino-3-methyl-6-tert.-butyl - 4,5 - dihydro-1,2,4-triazinone-(5) required as the starting material can be prepared as follows:

Into a boiling solution of 2360 grams 4-amino-3-methyl-mercapto-6-tert.-butyl - 4,5 - dihydro - 1,2,4-triazinone-(5) (see Japanese patent specification 547,317) in 770 ml. glacial acetic acid and 4000 ml. isopropanol there was introduced, after the addition of 28 grams p-toluene sulfonic acid, monomethylamine for 56 hours. After cooling, the crystallized reaction product was filtered off with suction. A further portion was obtained from the filtrate after stirring the latter together with water.

Yield: 1978 grams (91% of the theory); M.P. 234° C.

In an analogous manner, the following new 1,2,3,7-tetrahydro-[1,2,4]triazolo[3,2-c][1,2,4]-triazinones - (7) of the Formula 1 can be prepared:

TABLE 2

| Ex. No. | Starting materials Triazinone (2) | Oxo compound (3) | $R_1$ | $R_2$ | $R_3$ | $R_4$ | M.P. (° C.) |
|---|---|---|---|---|---|---|---|
| 2 | 4-amino-3-methylamino-6-tert.-butyl-4,5-dihydro-1,2,4-triazinone-(5), M.P. 234° C. | Cyclohexanone | t-$C_4H_9$ | —$(C_2H_5)_5$— | | $CH_3$ | 146 |
| 3 | do | Cyclopentanone | t-$C_4H_9$ | —$(CH_2)_4$— | | $CH_3$ | 132 |
| 4 | do | Methyl-isopropyl ketone | t-$C_4H_9$ | $CH_3$ | i-$C_3H_7$ | $CH_3$ | ¹142 |
| 5 | do | Methyl-ethyl-ketone | t-$C_4H_9$ | $CH_3$ | $C_2H_5$ | $CH_3$ | ¹131 |
| 6 | do | Isovaleraldehyde | t-$C_4H_9$ | H | i-$C_4H_9$ | $CH_3$ | 116 |
| 7 | do | Hexahydrobenzaldehyde | t-$C_4H_9$ | H | ⟨H⟩ | $CH_3$ | 144 |
| 8 | do | Isobutyraldehyde | t-$C_4H_9$ | H | i-$C_3H_7$ | $CH_3$ | ¹153 |
| 9² | 4-amino-3-ethylamino-6-tert.-butyl-4,5-dihydro-1,2,4-triazinone-(5), M.P. 178° C. | Cyclohexanone | t-$C_4H_9$ | —$(CH_2)_5$— | | $C_2H_5$ | 180 |
| 10 | 4-amino-3-methylamino-6-isopropyl-4,5-dihydro-1,2,4-triazinone-(5), M.P. 142° C. | Acetone | i-$C_3H_7$ | $CH_3$ | $CH_3$ | $CH_3$ | 165 |
| 11 | do | Cyclohexanone | i-$C_3H_7$ | —$(CH_2)_5$— | | $CH_3$ | 173 |
| 12 | do | Chloral | i-$C_3H_7$ | H | $CCl_3$ | $CH_3$ | (³) |
| 13 | 4-amino-3-ethylamino-6-isopropyl-4,5-dihydro-1,2,4-triazinone-(5), M.P. 158° C. | Acetone | i-$C_3H_7$ | $CH_3$ | $CH_3$ | $C_2H_5$ | 110 |
| 14 | 4-amino-3-n-butylamino-6-isopropyl-4,5-dihydro-1,2,4-triazinone-(5), M.P. 125° C. | do | i-$C_3H_7$ | $CH_3$ | $CH_3$ | n-$C_4H_9$ | 187 |
| 15 | 4-amino-3-n-dodecylamino-6-isopropyl-4,5-dihydro-1,2,4-triazinone-(5), M.P. 104° C. | Cyclohexanone | i-$C_3H_7$ | —$(C_2H)_5$— | | n-$C_{12}H_{25}$ | (⁴) |
| 16 | 4-amino-3-anilino-6-isopropyl-4,5-dihydro-1,2,4-triazinone-(5), M.P. 162° C. | Acetone | i-$C_3H_7$ | $CH_3$ | $CH_3$ | $C_6H_5$ | 167 |
| 17 | do | Cyclohexanone | i-$C_3H_7$ | —$(CH_2)_5$— | | $C_6H_5$ | 169 |
| 18 | 4-amino-3-benzylamino-6-isopropyl-4,5-dihydro-1,2,4-triazinone-(5), M.P. 144° C. | do | i-$C_3H_7$ | —$(CH_2)_5$— | | $CH_2$—$C_6H_5$ | 150 |
| 19 | 4-amino-3-methylamino-6-cyclohexyl-4,5-dihydro-1,2,4-triazinone-(5), M.P. 141° C. | Acetone | ⟨H⟩ | $CH_3$ | $CH_3$ | $CH_3$ | 91 |
| 20 | do | Cyclohexanone | Same | —$(CH_2)_5$— | | $CH_3$ | 85 |
| 21 | 4-amino-3-n-butylamino-6-cyclohexyl-4,5-dihydro-1,2,4-triazinone-(5), M.P. 173° C. | do | do | —$(CH_2)_5$— | | n-$C_4H_9$ | 176 |
| 22 | 4-amino-3-methylamino-6-methyl-4,5-dihydro 1,2,4-triazinone-(5), M.P. 180° C. | Acetone | $CH_3$ | $CH_3$ | $CH_3$ | $CH_3$ | 131 |
| 23 | do | Cyclohexanone | $CH_3$ | —$(CH_2)_5$— | | $CH_3$ | 168 |
| 24 | 4-amino-3-methylamino-6-phenyl-4,5-dihydro-1,2,4-triazinone-(5), M.P. 212° C. | Acetone | $C_6H_5$ | $CH_3$ | $CH_3$ | $CH_3$ | 179 |
| 25 | do | Cyclohexanone | $C_6H_5$ | —$(CH_2)_5$— | | $CH_3$ | 204 |

¹ Decomposition.
² The starting material for Example 9, 4-amino-3-ethylamino-6-tert.-butyl-4,5-dihydro-1,2,4-triazinone-(5), can be prepared as follows: 350 grams 4-amino-3-methylmercapto-6-tert.-butyl-4,5-dihydro-1,2,4-triazinone-(5) were suspended in a mixture of 820 ml. isopropanol and 114 ml. glacial acetic acid. At reflux temperature, gaseous ethylamine was introduced into the reaction mixture. Boiling under reflux was then effected for a further 5 hours, followed (after cooling) by pouring into 4 liters of cold water, while stirring, and then effecting suction filtration of the precipitated reaction product. Crude yield: 251 grams (73% of the theory). After recrystallization from 1 liter of toluene, 224 grams (65%pure product) of M.P. 178° C. were obtained.
³ From 126 (decomposition).
⁴ Not sharp from 50.

What is claimed is:

1. 1,2,3,7 - tetrahydro-[1,2,4]triazolo[3,2-c][1,2,4]-triazinone-(7) compound of the formula

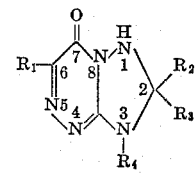

in which:

$R_1$ is hydrogen, lower alkyl of up to 5 carbon atoms, alkenyl of up to 3 carbon atoms, cycloalkyl of from 5 to 7 ring carbon atoms, benzyl, phenethyl or phenyl wherein said alkyl, alkenyl, cycloalkyl, benzyl, phenethyl, or phenyl may be substituted with at least one halogen or lower alkyl;

$R_2$ and $R_3$ individually are hydrogen, alkyl of from 1 to 5 carbon atoms, cycloalkyl or about 6 ring carbon atoms, or benzyl; and $R_2$ and $R_3$ taken together, are alkylene of from 4 to 7 ring carbon atoms which may carry one or more alkyl group substituents; and $R_4$ is hydrogen, alkyl of from 1 to 4 carbon atoms, alkenyl of up to 3 carbon atoms, benzyl, or phenyl.

2. Compound as claimed in claim 1 wherein R is branched alkyl of from 3 to 5 carbon atoms.

3. Compound as claimed in claim 1 wherein $R_1$ is cyclohexyl.

4. Compound as claimed in claim 1 wherein $R_1$ is phenyl or chlorophenyl.

5. Compound as claimed in claim 1 wherein $R_4$ is alkyl of from 1 to 4 carbon atoms.

6. Compound as claimed in claim 1 wherein $R_2$ and $R_3$ are individually hydrogen or lower alkyl of up to about 5 carbon atoms.

7. Compound as claimed in claim 1 wherein said compound is designated as 2,2,3-trimethyl-6-tert.-butyl-1,2,3,7-tetrahydro-[1,2,4]-triazolo[3,2-c][1,2,4]-triazinone-(7).

8. Compound as claimed in claim 1 wherein said compound is designated as 2-ethyl-2,3-dimethyl-6-tert.-butyl-1,2,3,7-tetrahydro - [1,2,4] - triazolo[3,2-c][1,2,4]-triazinone-(7).

9. Compound as claimed in claim 1 wherein said compound is designated as 2-isopropyl-3-methyl-6-tert.-butyl-1,2,3,7-tetrahydro - [1,2,4] - triazolo[3,2-c][1,2,4]-triazinone-(7).

10. Compound as claimed in claim 1 wherein said compound is designated as 2,2-pentamethylene-3-methyl-6-tert. - butyl - 1,2,3,7 - tetrahydro-[1,2,4]-triazolo[3,2-c][1,2,4]-triazinone-(7).

11. Compound as claimed in claim 1 wherein said compound is designated as 2,3-dimethyl-2-isopropyl-6-tert. - butyl - 1,2,3,7 - tetrahydro-[1,2,4]-triazolo[3,2-c][1,2,4]-triazinone-(7).

12. Compound as claimed in claim 1 wherein said compound is designated as 2,2,3-trimethyl-6-phenyl-1,2,3,7-tetrahydro-[1,2,4]-triazolo-[3,2-c][1,2,4]-triazinone-(7).

13. Compound as claimed in claim 1 wherein said compound is designated as 2,2,3-trimethyl-6-isopropyl-1,2,3,7-tetrahydro-[1,2,4]-triazolo[3,2-c][1,2,4]-triazinone-(7).

14. Compound as claimed in claim 1 wherein said compound is designated as 2,2-pentamethylene-3-methyl-6-isopropyl - 1,2,3,7-tetrahydro-[1,2,4]-triazolo[3,2-c][1,2,4]-triazinone-(7).

15. Process for the preparation of a compound as claimed in claim 1 which process comprises reacting a 3,4-diamino-4,5-dihydro-1,2,4-tirazinone of the formula

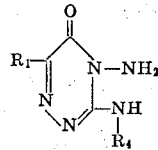

in which $R_1$ and $R_4$ have the meanings given in claim 1, with an oxo compound of the formula

in which $R_2$ and $R_3$ have the meanings given in claim 1, in the presence of a lower alkanoic acid.

16. A process as claimed in claim 15 in which the reaction is carried out at 20° to 120° C.

17. A process as claimed in claim 15 in which the reaction is carried out at 50 to 100° C.

18. A process as claimed in claim 15 in which the reaction is carried out in the presence of an inert organic solvent.

19. A process as claimed in claim 15 in which the lower aliphatic carboxylic acid is acetic acid.

20. Process as claimed in claim 15 wherein $R_1$ and $R_4$ are lower alkyl and wherein $R_2$ and $R_3$ are individually hydrogen or lower alkyl and, together, lower alkylene of from 4 to 7 carbon atoms.

21. Process as claimed in claim 15 wherein $R_1$ is cyclohexyl, phenyl or chlorophenyl, $R_4$ is lower alkyl and $R_2$ and $R_3$ are individually hydrogen or lower alkyl and, together, lower alkylene of from 4 to 7 carbon atoms.

References Cited
UNITED STATES PATENTS

| | | | |
|---|---|---|---|
| 3,331,840 | 7/1967 | Fry et al. | 260—249.5 |
| 3,398,148 | 8/1968 | Fry et al. | 260—249.5 |
| 3,549,631 | 12/1970 | Lewis et al. | 260—249.5 |

JOHN M. FORD, Primary Examiner

U.S. Cl. X.R.

71—93